United States Patent [19]

Butler

[11] Patent Number: 5,655,360
[45] Date of Patent: Aug. 12, 1997

[54] THRUST REVERSER WITH VARIABLE NOZZLE

[75] Inventor: Lawrence Butler, Cincinnati, Ohio

[73] Assignee: General Electric Company, Cincinnati, Ohio

[21] Appl. No.: 694,808

[22] Filed: Aug. 9, 1996

Related U.S. Application Data

[63] Continuation of Ser. No. 455,881, May 31, 1995, abandoned.

[51] Int. Cl.$^6$ ....................................................... F02K 3/02
[52] U.S. Cl. ........................... 60/226.2; 60/262; 60/232; 244/110 B; 239/265.31; 239/265.29
[58] Field of Search ...................... 60/226.2, 226.3, 60/228, 232, 230, 262, 271; 244/110 B; 239/265.29, 265.31, 265.11, 265.19, 265.33

[56] References Cited

U.S. PATENT DOCUMENTS

| | | | |
|---|---|---|---|
| 3,333,772 | 8/1967 | Bruner | 239/265.13 |
| 3,503,211 | 3/1970 | Medawar et al. | 60/226.2 |
| 3,665,709 | 5/1972 | Medawar et al. | 60/226.2 |
| 3,779,010 | 12/1973 | Chamay et al. | 239/265.31 |
| 3,820,719 | 6/1974 | Clark | 60/226.2 |
| 3,829,020 | 8/1974 | Stearns | 239/265.29 |
| 4,278,220 | 7/1981 | Johnston et al. | 60/226.2 |
| 4,501,393 | 2/1985 | Klees et al. | 239/265.13 |
| 4,716,724 | 1/1988 | Newton | 60/226.2 |
| 4,922,713 | 5/1990 | Barbarin et al. | 239/265.31 |

OTHER PUBLICATIONS

General Electric, "CF6–80 Engine Student Notebook," 1 Jun. 1983, pp.: cover, i, 236–270.

Primary Examiner—Timothy Thorpe
Assistant Examiner—Ted Kim
Attorney, Agent, or Firm—Andrew C. Hess; Patrick R. Scanlon

[57] ABSTRACT

A thrust reverser is provided for both modulating and reversing bypass flow discharged from a fan through a bypass duct of a turbofan gas turbine engine. The reverser includes an aft cowl joined to a forward cowl and having an aft end surrounding a core engine to define a discharge fan nozzle of minimum flow throat area. The aft cowl is axially translatable relative to the forward cowl from a first position fully retracted against the forward cowl, to a second position partially extended from the forward cowl, and to a third position fully extended from the forward cowl. A plurality of cascade turning vanes are disposed between the forward and aft cowls, and a plurality of thrust reversing deflector doors are pivotally mounted to the aft cowl and bound the bypass duct. The deflector doors are selectively deployed from a stowed position corresponding with the first and second positions of the aft cowl for allowing unrestricted flow of the bypass flow through the fan nozzle. The doors also have a deployed position corresponding with the third position of the aft cowl for substantially deflecting the bypass flow from discharging through the fan nozzle to discharging through the cascade vanes for effecting thrust reverse. Axial translation of the aft cowl between the first and second positions varies flow area of the fan nozzle to vary thrust effected by the discharged bypass flow.

6 Claims, 2 Drawing Sheets

THRUST REVERSER WITH VARIABLE NOZZLE

This application is a Continuation of application Ser. No. 08/455,881, file May 31, 1995, now abandoned.

The Government has rights to this invention pursuant to Contract No. NAS3-25953 awarded by NASA.

BACKGROUND OF THE INVENTION

The present invention relates generally to aircraft gas turbine engines, and, more specifically, to a high bypass turbofan engine having a fan thrust reverser.

High bypass turbofan gas turbine engines are commonly used for powering an aircraft in flight. The turbofan engine includes a core engine surrounded by a core cowl for powering a fan disposed upstream therefrom. A nacelle surrounds the fan and a portion of the core engine and is spaced therefrom to define an annular bypass duct, with the nacelle having a fan inlet at a forward end thereof and a fan outlet or nozzle at an aft end thereof defined around the core cowl.

Disposed in the aft section of the fan nacelle is a conventional fan thrust reverser for reversing thrust upon landing of the aircraft to enhance its stopping capability. The fan thrust reverser is typically mounted between an axially translatable aft cowl and a stationary forward cowl. A plurality of thrust reversing deflector doors are mounted around the inner perimeter of the aft cowl and are typically deployed by various linkages and actuators as the aft cowl translates aft when required. The deflector doors block bypass flow and divert it radially outwardly through conventional cascade turning vanes mounted between the forward and aft cowls which deflect the bypass flow in a forward direction for reversing thrust. The cascade vanes are uncovered when the aft cowl is deployed and are covered when the aft cowl is stowed.

Although the fan nozzle is necessarily repositioned upon axial translation of the aft cowl during deployment of the thrust reverser, it is then inoperative since the bypass flow is diverted through the cascade vanes. When the thrust reverser is stowed, the fan nozzle provides a fixed discharge flow area of the bypass duct which is typically preselected for maximizing efficiency of the turbofan engine at a given design point such as cruise operation of the aircraft in flight. Variable area operation is therefore not possible with a conventional fan thrust reverser. However, variable area fan nozzles are known in the art and are effective for providing enhanced performance of turbofan engines by allowing adjustments in discharge area depending upon required operating conditions. However, conventionally known variable area fan nozzles are relatively complex and would substantially add to the complexity of the fan nacelle in the area of the required thrust reverser due to the attendant separate nozzle flaps and actuators required therefor.

SUMMARY OF THE INVENTION

A thrust reverser is provided for both modulating and reversing bypass flow discharged from a fan through a bypass duct of a turbofan gas turbine engine. The reverser includes an aft cowl joined to a forward cowl and having an aft end surrounding a core engine to define a discharge fan nozzle of minimum flow throat area. The aft cowl is axially translatable relative to the forward cowl from a first position fully retracted against the forward cowl, to a second position partially extended from the forward cowl, and to a third position fully extended from the forward cowl. A plurality of cascade turning vanes are disposed between the forward and aft cowls, and a plurality of thrust reversing deflector doors are pivotally mounted to the aft cowl and bound the bypass duct. The deflector doors are selectively deployed from a stowed position corresponding with the first and second positions of the aft cowl for allowing unrestricted flow of the bypass flow through the fan nozzle. The doors also have a deployed position corresponding with the third position of the aft cowl for substantially deflecting the bypass flow from discharging through the fan nozzle to discharging through the cascade vanes for effecting thrust reverse. Axial translation of the aft cowl between the first and second positions varies flow area of the fan nozzle to vary thrust effected by the discharged bypass flow.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
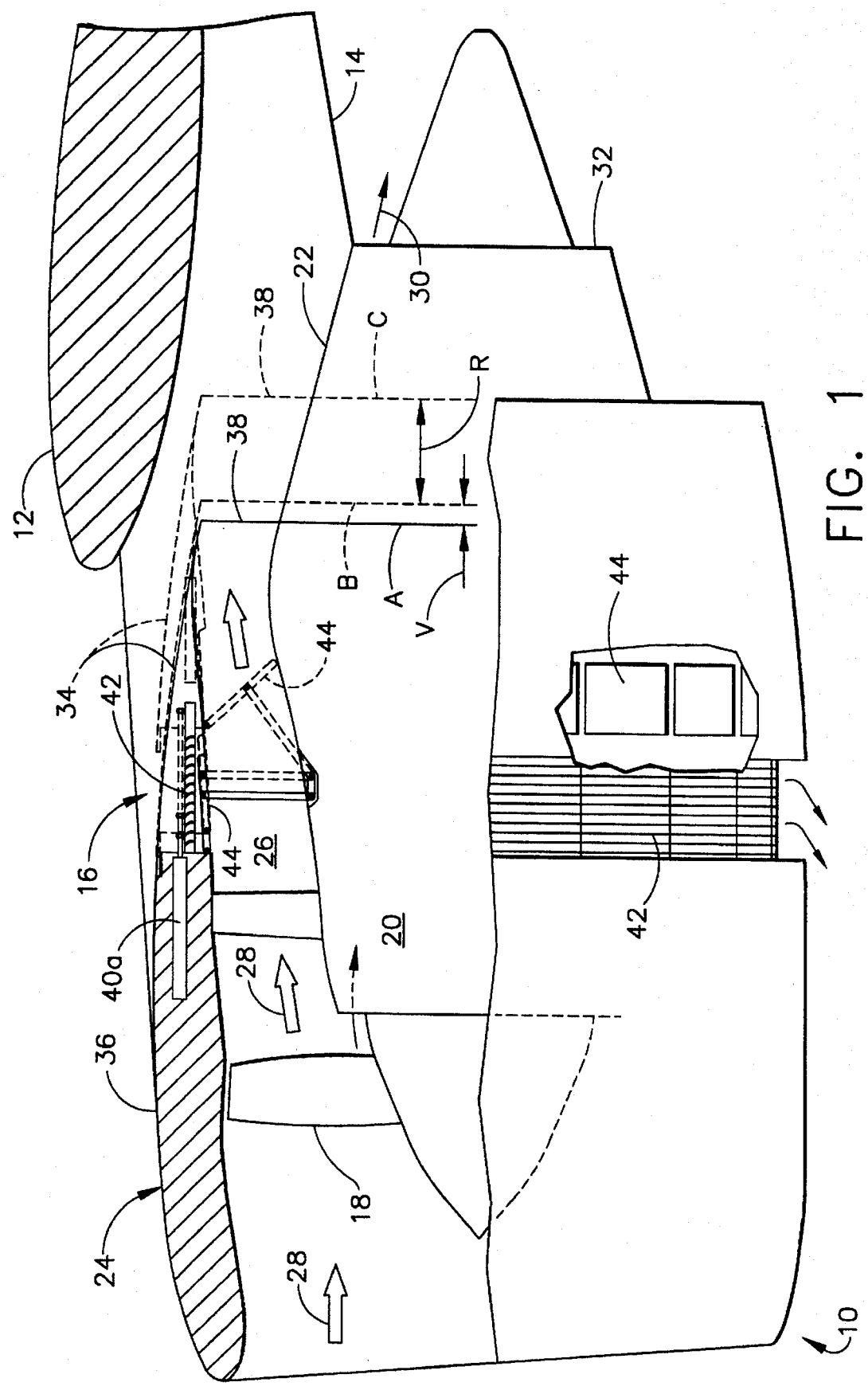
FIG. 1 is a partly sectional side view of an exemplary aircraft turbofan gas turbine engine mounted to a wing of an aircraft and illustrating a variable area thrust reverser in accordance with one embodiment of the present invention.

Illustrated schematically in FIG. 1 is an exemplary aircraft high bypass, turbofan gas turbine engine 10 mounted to a wing 12 of an aircraft by a conventional pylon 14. The engine 10 includes a thrust reverser 16 having a variable area nozzle in accordance with the present invention and is otherwise conventional in structure and operation.

The engine 10 includes a fan 18 powered by a conventional core engine 20. The core engine 20 includes a compressor, combustor, and high and low pressure turbines (all not shown) with the high pressure turbine powering the compressor, and the low pressure turbine powering the fan 18. The core engine 20 is enclosed in an annular core cowl 22, and a fan nacelle 24 surrounds the fan 18 and a portion of the core engine 20. An annular bypass duct 26 is defined between a forward portion of the core cowl 22 around the core engine 20 and the aft inner surface of the nacelle 24 spaced radially outwardly therefrom.

During operation, ambient air 28 enters the inlet of the engine 10 and flows past the fan 18, with an inner portion thereof flowing through the core engine 20 for being compressed, mixed with fuel, and ignited for generating combustion gases 30 which are discharged from a core nozzle 32 of the core engine 20, with an upper portion of the air being channeled as bypass flow, also designated 28, which flows downstream through the bypass duct 26.

In accordance with the present invention, the fan thrust reverser 16 includes an annular aft cowl 34 of the nacelle 24 which is joined to a stationary forward cowl 36 of the nacelle 24. The aft cowl 34 has an aft or downstream end defining, with a portion of the core cowl 22, a discharge fan nozzle 38 of minimum flow or throat area at an aft end of the bypass duct 26 through which is discharged the bypass flow 28 channeled through the bypass duct 26 during normal operation.

Figure 2:
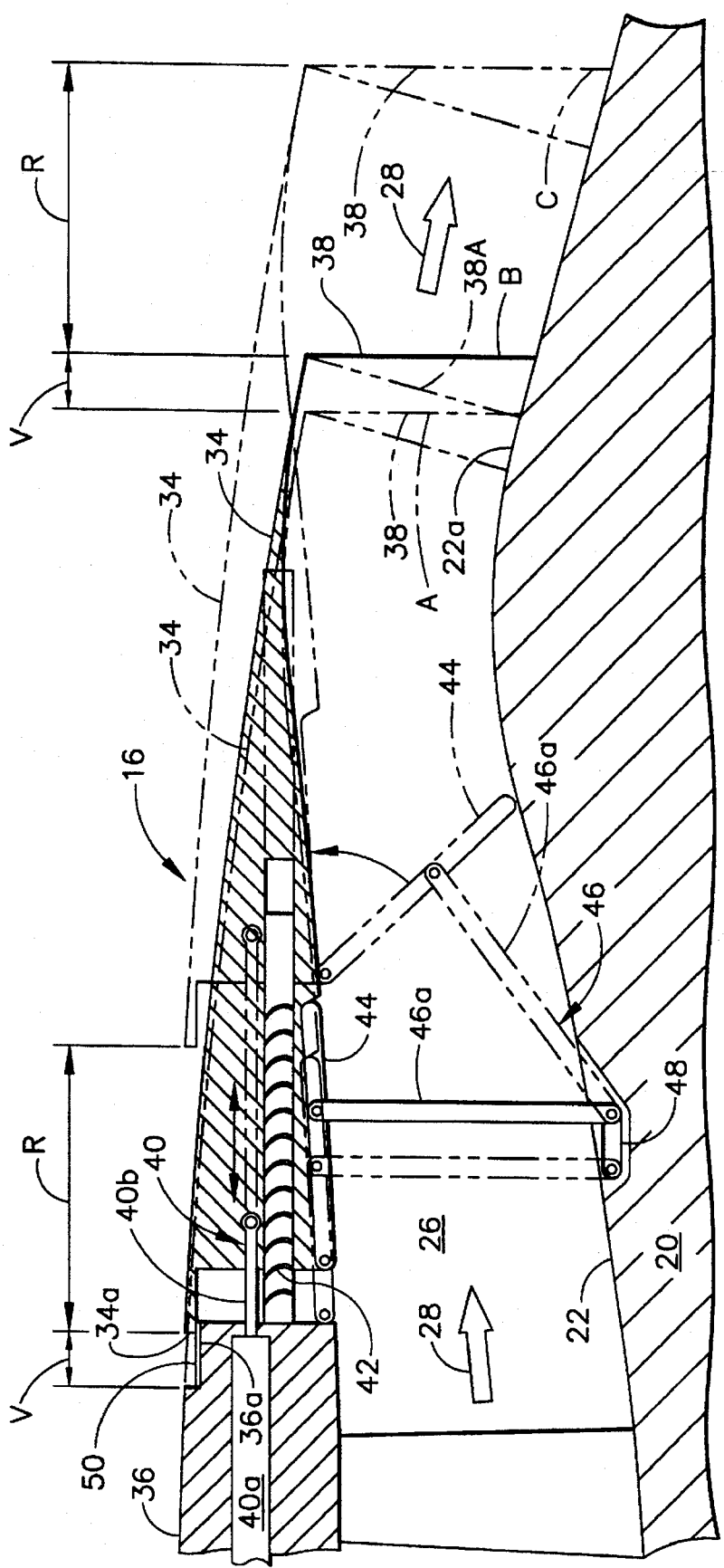
FIG. 2 is an enlarged sectional view through a portion of the thrust reverser illustrated in FIG. 1.

The fan thrust reverser 16 is illustrated in more particularity in FIG. 2 and includes conventional means 40 for selectively axially translating the aft cowl 34 relative to the forward cowl 36. In this exemplary embodiment, the translating means 40 include a plurality of circumferentially spaced apart actuators or motors 40a and respective extending rods in the exemplary form of conventional ball screws 40b which are suitably joined to the aft cowl 34. The axial translating means 40 may be electrically or fluidly powered in conventional fashion for axially translating the aft cowl 34 from a first position A which is fully retracted against the forward cowl 36, to a second position B which is partially extended from the forward cowl 36 in the aft direction, and to a third position C which is fully extended from the forward cowl 36 in the aft direction.

A plurality of conventional cascade turning vanes 42 are disposed between or at the juncture of the aft and forward cowls 34, 36 which are selectively uncovered upon axial translation of the aft cowl 34 upon reaching the third position C.

A plurality of conventional thrust reversing deflector or blocker doors 44 are conventionally pivotally mounted to the aft cowl 34 and bound or border the bypass duct 28 when stowed. The deflector doors 44 are selectively deployed by means 46 which are otherwise conventional except as modified in accordance with the present invention for predeterminedly delaying deployment of the deflector doors 44 until the aft cowl 34 reaches its second position B. In the exemplary embodiment illustrated in FIG. 2, the deploying means 46 includes suitable linkage such as a plurality of rods or links 46a operatively joined to the doors 44 for effecting deployment and stowing as required. In the exemplary embodiment illustrated in FIG. 2, one or more links 46a is joined to each of the doors 44 and is pivotally joined at one end to the core engine 20 and is pivotally joined at an opposite end to an intermediate portion of the door 44. Each of the doors 44 is pivotally joined at its forward or upstream end to the inner portion of the aft cowl 34 so that the doors 44 may conventionally pivot downwardly into the bypass duct 26 as the aft cowl 34 translates in the aft direction.

In accordance with the present invention, the deploying means 46 are effective for deploying the deflector doors 44 from the stowed position which are fully retracted into the aft cowl 34 for allowing unrestricted flow of the bypass flow 28 through the bypass duct 26 and out the fan nozzle 38. The stowed position corresponds with positions of the aft cowl 34 between its first and second positions A and B. In this way, the aft cowl 34 is allowed to axially translate at any desired position between the first and second positions A and B for selectively varying flow area of the fan nozzle 38 to vary thrust effected by the discharge bypass flow 28 without the doors 44 restricting flow. The deploying means 46 are also effective to position the doors 44 to a deployed position which corresponds with the third position C of the aft cowl 34 for substantially deflecting the bypass flow 28 from discharging through the fan nozzle 38 to instead discharge radially outwardly through the vanes 42 for effecting thrust reverse.

The various positions of the aft cowl 34 are illustrated in FIGS. 1 and 2. In the top half of FIG. 1, the aft cowl 34 is illustrated in solid line in its first position A, and is illustrated in phantom line in its second and third positions B and C. Correspondingly, the deflector doors 44 are illustrated in solid line in their stowed position and in phantom line in their deployed position. In the lower half of FIG. 1, the aft cowl 34 is illustrated in solid line in its third position C which fully exposes the turning vanes 42 for obtaining thrust reverse. In FIG. 2, the aft cowl 34 is illustrated in solid line in its second position B, and in phantom line in both its first and third positions A and C. The blocker doors 44 are illustrated in solid line in their stowed position corresponding with aft cowl position B, and in phantom line in the stowed position corresponding with aft cowl position A and deployed position corresponding with aft cowl position C.

Referring again to FIG. 2, the bypass duct 26 is suitably configured to provide a converging flow area which terminates at the minimum flow area effected at the fan nozzle 38. In this exemplary embodiment, the core cowl 22 has a portion 22a which is contoured to slope radially inwardly in the axial aft direction and is generally frustoconical at least relative to the aft end of the aft cowl 34 defining the fan nozzle 38 between the first and second positions A and B of the aft cowl 34 so that axial translation of the aft cowl 34 varies the throat area, designated 38A, of the fan nozzle 38. The throat area 38A is the minimum flow area defined by the fan nozzle 38 along a line extending perpendicularly outwardly from the core cowl sloping portion 22a. In the preferred embodiment illustrated in FIG. 2, the throat area 38A effected at the second position B of the aft cowl 34 is preferably greater than the throat area effected at the first position A of the aft cowl 34.

Accordingly, by simply modifying existing structures of a conventional fan thrust reverser, the aft cowl 34 may be allowed to axially translate over a predetermined length V corresponding with extension between the first and second positions A and B of the aft cowl 34 so that the fan nozzle 38 defined by the aft end of the aft nozzle 34 may be used for varying discharge flow area and in turn enjoying all of the conventionally known advantages associated with variable area fan nozzles. From the first to second positions A and B, the deflector doors 44 merely translate along with the aft cowl 34 but remain stowed during this initial movement for effecting variable area operation of the fan nozzle 38 without interference by the deflector doors 44. However, upon further extending the aft cowl 34 from its second to third positions B and C over a predetermined length R, the deflector doors 44 may then be fully deployed upon reaching the third position C of the aft cowl 34 to block the bypass duct 26 and divert the bypass flow 28 radially outwardly through the cascade vanes 42 and between the now separated aft and forward cowls 34, 36 for effecting fan thrust reverse.

As indicated above, conventional fan thrust reversers may be suitably modified to delay deployment of their deflector doors to allow the fan nozzles thereof to be used for varying discharge flow area in accordance with the present invention. In the exemplary embodiment illustrated in FIG. 2, the link 46a may be mounted to effect lost motion or play as the aft cowl 34 is translated between the first and second positions A and B thereof to delay deployment of the doors 44. This may be simply done for example by mounting the proximal ends of the links 46a in suitable axially extending slots 48 which allow the doors 44 to translate axially aft with the lengths 46a being carried axially aft in the slots 48 without effecting tensile loads in the lengths 46a which would pull and deploy the doors 44. Upon reaching the aft extent of travel in the slots 48, the links 46a are then restrained from further axial movement so that upon further axial rearward movement of the aft cowl 44, the doors 44 are caused to be pivoted radially inwardly around their forward pivots for deploying the doors 44 into the bypass duct 26. Accordingly, deployment of the doors 44 occurs only upon translation of the aft cowl 34 between the second and third positions B and C thereof.

Any suitable configuration for obtaining lost motion may be used. The links 46a could telescope, or the doors 44 themselves could be pivotally mounted in slots in the aft cowl 34 instead of using the slots 48 in the core engine support.

Since the thrust reverser in accordance with the present invention may be a simple modification of an existing thrust reverser, the normal thrust reverse deployment range of travel as represented by the length R will remain the same with additional travel represented by the length V being provided for variable area operation. The additional travel V may be simply effected by increasing the length of the ball screws 40b in the actuators 40a.

Since the aft cowl 34 extends partially aft during the variable area operation between the first and second positions A and B, it is desirable to seal the adjoining forward end 34a of the aft cowl 34 and the aft end 36a of the forward cowl 36. This may be accomplished for example by configuring the aft and forward ends 34a and 36a in an overlapping or lap joint arrangement, and by also including a suitable leaf seal 50 therebetween. The axial extent of the forward end 34a of the aft cowl 34 may be selected to ensure an effective seal over the entire axial travel length V as the aft cowl 34 is translated from its first to second positions A and B. In this way, bypass flow 28 is sealed against undesirable leakage radially outwardly through the vanes 42 and between the spaced apart portions of the aft and forward cowls 34 and 36.

Exemplary advantages due to varying the discharge flow area of the fan nozzle 38 includes improved matching of performance of the engine 10 with required operating conditions thereof. Increased thrust output from the engine 10 may be obtained, or conversely the engine 10 may be reconfigured with a smaller diameter fan 18 for effecting the same output thrust. In this way the engine 10 may be made substantially smaller and lighter in weight and still produce the original amount of thrust at high altitude and top of climb by effective use of the thrust reverser 16 in its variable area mode of operation.

Downsizing of the engine 10 due to the ability to modulate the throat flow area of the fan nozzle 38 allows top of climb thrust to be obtained with a smaller engine. Takeoff thrust of the smaller engine may be restored by running the fan 18 faster. The smaller engine 16 would utilize the same sized core 20 but with a suitably reduced fan diameter and corresponding reduction in bypass flow 28.

Downsizing of the fan 18 can result in substantial reductions in weight and drag with corresponding reduction in aircraft operating cost. The reduction in fan size also allows easier installation of the engine on the aircraft wing 12. And, these exemplary advantages may be obtained with little addition to the complexity of existing types of fan thrust reversers. The final cost and weight of the variable area thrust reverser in accordance with the present invention could be lower than that of a conventional arrangement because downsizing of the entire fan and nacelle should more than compensate for the additional mechanical features required to implement the invention.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A thrust reverser for modulating and reversing bypass flow discharged from a fan through a bypass duct defined between a core engine and a fan nacelle comprising:

an aft cowl of said nacelle joined to a forward cowl thereof and having an aft end defining with a core cowl surrounding said core engine a discharge fan nozzle of minimum flow throat area at an aft end of said bypass duct;

a plurality of cascade turning vanes disposed between said aft and forward cowls;

means for axially translating said aft cowl relative to said forward cowl from a first position fully retracted against said forward cowl and covering said vanes, to a second position partially extended from said forward cowl and covering said vanes to seal leakage of said bypass flow radially outwardly through said vanes and confine said bypass flow to discharge through said fan nozzle, and to a third position fully extended from said forward cowl and uncovering said vanes;

a plurality of thrust reversing deflector doors pivotally mounted to said aft cowl and bounding said bypass duct;

means for selectively deploying said deflector doors from a stowed position corresponding with positions of said aft cowl between said cowl first and second positions for allowing flow of said bypass flow through said fan nozzle without restriction from said doors, to a deployed position corresponding with said third position of said aft cowl substantially deflecting said bypass flow from discharging through said fan nozzle to discharging through said vanes for effecting thrust reverse wherein said means for selectively deploying said deflector doors includes a plurality of links, each of said links being pivotally connected at one end directly to said core engine and pivotally connected at an opposite end directly to said deflector doors so that each one of said deflector doors is connected to at least one of said links; and wherein axial translation of said aft cowl between said first and second positions varies flow area of said fan nozzle to vary thrust effected by said discharged bypass flow.

2. A thrust reverser according to claim 1 wherein said core cowl has a sloping portion relative to said aft end of said aft cowl between said aft cowl first and second positions so that axial translation of said aft cowl varies said throat area of said fan nozzle.

3. A thrust reverser according to claim 2 wherein said throat area effected at said second position of said aft cowl is greater than said throat area effected at said first position of said aft cowl.

4. A thrust reverser according to claim 2 wherein said deploying means include links for deploying said doors, said links being mounted to effect lost motion as said aft cowl is translated between said first and second positions thereof to prevent deployment of said doors, with deployment of said doors occurring only upon translation of said aft cowl between said second and third positions thereof.

5. A thrust reverser according to claim 2 further comprising means for sealing adjoining ends of said aft and forward cowls to seal flow leakage therethrough from said bypass duct through said vanes between said first and second positions of said aft cowl.

6. A thrust reverser according to claim 2 wherein said doors are disposed in axial alignment with said vanes when in said stowed position and axially aft of said vanes when in said deployed position.

* * * * *